United States Patent [19]

Barer

[11] 3,919,232

[45] Nov. 11, 1975

[54] CHLORINATED BARBITURIC ACIDS

[76] Inventor: Sol J. Barer, 415 Cherry St., Elizabeth, N.J. 07208

[22] Filed: Mar. 26, 1974

[21] Appl. No.: 454,861

[52] U.S. Cl. .................................. 260/257; 424/254
[51] Int. Cl.² ....................................... C07D 239/62
[58] Field of Search .................................... 260/257

[56] References Cited
OTHER PUBLICATIONS
Chemical Abstracts, Vol. 70, 1969, 4005y relied on.

Otsuji et al., Bull. Chem. Soc. Jap., 1968, 41(9), 2124–2128.

*Primary Examiner*—Donald G. Daus
*Assistant Examiner*—Anne Marie T. Tighe
*Attorney, Agent, or Firm*—Cushman, Darby & Cushman

[57] ABSTRACT

N,N'-dichloro barbituric acids are prepared. They are useful as biocides, especially as fungicides.

4 Claims, No Drawings

CHLORINATED BARBITURIC ACIDS

The present invention is directed to novel N-chloro barbituric acid derivatives.

Wolfes U.S. Pat. No. 1,073,380 discloses that N-haloalkyl-C,C-dialkyl barbituric acids, e.g., N-$\beta$,$\gamma$-dibromo propyl-5,5-diethyl barbituric acid and N-$\beta$-bromopropyl-5,5-diethyl barbituric acid, are old.

Attempts to prepare N-chloro barbituric acid compounds, however, are not known. Slezak et al in J. Org. Chem. Vol. 24, pages 1383–1385 discloses an attempt to make N,N-dichlorobarbituric acid by reacting with chlorine. However, the product obtained was $\alpha,\alpha$-dichloro acetyl urea.

It has now been found that there can be prepared N,N'-dichlorobarbituric acid derivatives of the formula:

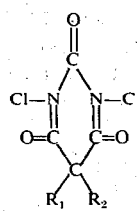

where $R_1$ and $R_2$ are hydrogen, chlorine or alkyl. More preferably both $R_1$ and $R_2$ are either chlorine or alkyl, still more preferably lower alkyl, usually alkyl of one to four carbon atoms. Most preferably both $R_1$ and $R_2$ are ethyl or chlorine.

Illustrative of compounds within the invention are
N,N',5,5-tetrachlorobarbituric acid,
N,N'-dichloro-5,5-diethyl barbituric acid,
N,N'-dichloro-5,5-dimethyl barbituric acid,
N,N'-dichloro-5,5-dipropyl barbituric acid,
N,N'-dichloro-5,5-diisopropyl barbituric acid,
N,N'-dichloro-5,5-dibutyl barbituric acid,
N,N'-dichloro-5,5-diamyl barbituric acid,
N,N'-dichloro-5,5-dihexyl barbituric acid,
N,N'-dichloro-5,5-di sec. butyl barbituric acid,
N,N'-dichloro-5,5-dioctyl barbituric acid,
N,N'-dichloro-5-ethyl-5-isopropyl barbituric acid,
N,N'-dichloro-5-ethyl-5-isoamyl barbituric acid,
N,N'-dichloro-5-ethyl-5-hexyl barbituric acid,
N,N'-dichloro-5-ethyl-1'-methylbutyl barbituric acid,
N,N'-dichloro-5-methyl-5-ethyl barbituric acid,
N,N'-dichloro-5-methyl-5-propyl barbituric acid,
N,N'-dichloro-5-methyl-5-amyl barbituric acid,
N,N'-dichloro-5-methyl-5-isobutyl barbituric acid,
N,N'-5-trichloro-5-methyl barbituric acid,
N,N'-5-trichloro-5-ethyl barbituric acid,
N,N'-5-trichloro-5-butyl barbituric acid.

The compounds of the present invention are useful as sources of active chlorine, e.g., to purify swimming pools, drinking water, etc. They are useful as biocides, e.g., as bactericides and especially as fungicides, e.g., as soil fungicides. They also can be used as insecticides and ovicides, e.g., to destroy insect eggs.

The products of the present invention can be used alone or they can be applied together with inert solids to form dusts, or can be suspended in a suitable liquid diluent, e.g., organic solvents or water.

There can also be added surface active agents or wetting agents and/or inert solids in the liquid formulations. In such case, the active ingredient can be from 0.01 to 95 percent by weight of the entire composition.

As organic solvents there can be employed hydrocarbons, e.g., benzene, toluene, xylene, kerosene, diesel fuel, fuel oil, and petroleum naphtha, ketones such as acetone, methyl ethyl ketone and cyclohexanone, chlorinated hydrocarbons such as carbon tetrachloride, chloroform, trichloroethylene, and perchloroethylene, esters such as ethyl acetate, amyl acetate and butyl acetate, ethers, e.g., ethylene glycol monomethyl ether and diethylene glycol monomethyl ether, alcohols, e.g., methanol, ethanol, isopropanol, amyl alcohol, ethylene glycol, propylene glycol, butyl carbitol acetate and glycerine, mixtures of water and organic solvents, either as solutions or emulsions can be employed.

The novel products can also be applied a aerosols, e.g., by dispersing them in air by means of a compressed gas such as dichlorofifluoromethane dichlorodifluoromethane trichlorofluoromethane and other Freons and Genetrons, for example.

The products of the present invention can pyrophyllite, be applied with adjuvants or carriers such as talc, pyropyllite, synthetic fine silica, attapulgus clay, kieselguhr, chalk, diatomaceous earth, lime, calcium carbonate, bentonite, fuller's earth, cottonseed hulls, wheat flour, soybean flour, pumice, tripoli, wood flour, walnut shell flour, redwood flour and lignin.

As stated, it is frequently desirable to incorporate a surface active agent in the compositions of the present invention. Such surface active or wetting agents are advantageously employed in both the solid and liquid compositions. The surface active agent can be anionic, cationic or nonionic in character. When a surface active agent is present it is usually employed in an amount of 0.05 – 1% by weight.

Typical classes of surface active agents include alkyl sulfonate salts, alkylaryl sulfonate salts, alkylaryl polyether alcohols, fatty acid esters of polyhydric alcohols and the alkylene oxide addition products of such esters and addition products of long chain mercaptans and alkylene oxides. Typical examples of such surface active agents include the sodium alkylbenzene sulfonates having 10 to 18 carbon atoms in the alkyl group, alkylphenol ethylene oxide condensation products, e.g., p-isooctylphenol condensed with 10 ethylene oxide units, soaps, e.g., sodium stearate and potassium oleate, sodium salt of propyl-naphthalene sulfonic acid, di(2-ethylhexyl) ester of sodium sulfosuccinic acid, sodium lauryl sulfate, sodium decane sulfonate, sodium salt of the sulfonated monoglyceride of coconut fatty acids, sorbitan sesquioleate, lauryl trimethyl ammonium chloride, octadecyl trimethyl ammonium chloride, polyethylene glycol lauryl ether, polyethylene glycol esters of fatty acids and rosin acids, e.g., Ethofat 7 and 13, sodium N-methyl-N-oleyl taurate, Turkey Red Oil, sodium dibutyl naphthalene sulfonate, sodium lignin sulfonate, polyethylene glycol stearate, sodium dodecylbenzene sulfonate, tertiary dodecyl polyethylene glycol thioether (Nonionic 218), long chain ethylene oxide-propylene oxide condensationproducts, e.g., Pluronic 61 (molecular weight 1000), polyethylene glycol ester of tall oil acids, sodium octyl phenoxyethoxyethyl sulfate, tris(polyoxyethylene) sorbitan monostearate (Tween 60), and sodium dihexyl sulfosuccinate.

The solid and liquid formulations can be prepared by any of the conventional procedures. For example, the compounds of the present invention can be applied to soil, growing plants, e.g., trees, cotton plants, wheat and other grain plants, vegetable plants, seeds, fabrics, etc. to give pesticidal protection.

When applied to crops the compounds can be employed in widely varying amounts, e.g., 1 to 100 lbs/acre, usually between 5 and 50 lbs/acre. The compounds are applied to the fungi in a fungicidally effective amount.

EXAMPLE 1

Tetrachlorobarbituric acid 128 grams of barbituric acid were suspended in 1,250 ml of methylene chloride ($CH_2Cl_2$), the mixture cooled to below 0° centigrade and 500 ml t-butyl hypochlorite slowly added while maintaining the temperature below 10° C. The mixture was allowed to be stirred for two hours at room temperature at which time a solution had been obtained. The solution was stripped of solvent via vacuum to yield 266 grams of 100% pure tetrachlorobarbituric acid as determined by $KI/Na_2S_2O_3$ titration.

Expected: C 18.06%, O 18.06, Cl 53.34, N 10.53
Found: C 18.00%, O 18.10, Cl 53.44, N 10.61

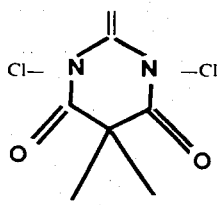

EXAMPLE 2

N,N'-dichloro-5,5-diethylbarbituric acid

The procedure of example 1 was repeated using 184 grams of barbital (5,5-diethylbarbituric acid) in 1,250 ml $CH_2Cl_2$, 253 grams of N,N-dichloro-5,5-diethyl barbituric acid (100% yield) was obtained having 98% purity by $KI/Na_2S_2O_3$ titration.

Expected: C 37.94%, H 39.52, N 11.07, Cl 28.06, O 18.97
Obtained: C 38.01%, H 39.48, N 11.00, Cl 28.07, O 18.89

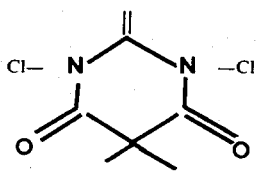

EXAMPLE 3

As a soil fungicide N,N'-dichloro-5,5-dichloro barbituric acid (tetrachlorobarbituric acid) was incorporated into the soil at 25 lbs./acre and compared with Captan (N-trichloromethyl thio-4-cyclohexene-1,2-dicarboximide) at 50 lbs./acre.

| Compound | Rate | Scleroti Rolfsii (% of disease control) | Fusarium Solani |
|---|---|---|---|
| Tetrachlorobarbituric Acid | 25/lbs./acre | 40 | 90 |
| Captan | 50/lbs./acre | 40 | 100 |

The compounds of the present invention are made by reacting barbituric acid or the appropriate substituted barbituric acid with an alkyl hypochlorite. Thus, there can be used barbituric acid, 5,5-dimethyl barbituric acid, 5,5-diethyl barbituric acid, 5,5-dipropyl barbituric acid, 5,5-diisopropyl barbituric acid, 5,5-dibutyl barbituric acid, 5,5-di sec. butyl barbituric acid, 5,5-diisobutyl barbituric acid, 5,5-diamyl barbituric acid, 5,5-diisoamyl barbituric acid, 5,5-dihexyl barbituric acid, 5,5-dioctyl barbituric acid, 5-methyl barbituric acid, 5-ethyl barbituric acid, 5-propyl barbituric acid, 5-isopropyl barbituric acid, 5-butyl barbituric acid, 5-amyl barbituric acid, 5-methyl-5-ethyl barbituric acid, 5-methyl-5-propyl barbituric acid, 5-methyl-5-butyl barbituric acid, 5-ethyl-5-butyl barbituric acid, 5-ethyl-5-sec. butyl barbituric acid, 5-ethyl-5-isoamyl barbituric acid, and 5-ethyl-5-hexyl barbituric acid. As hypochlorites there can be used for example t-butyl hypochlorite, t-amyl hypochlorite, propyl hypochlorite, isopropyl hypochlorite, methyl hypochlorite and ethyl hypochlorite with t-butyl hypochlorite being preferred.

What is claimed is:
1. A compound having the formula:

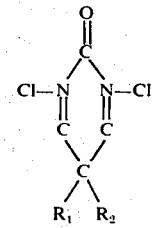

where $R_1$ is chlorine and $R_2$ is alkyl of one to eight carbon atoms or chlorine.

2. A compound according to claim 1 wherein $R_1$ and $R_2$ are both chlorine.

3. A compound according to claim 1 wherein $R_1$ is chlorine and $R_2$ is alkyl of one to eight carbon atoms.

4. A compound according to claim 3 wherein $R_2$ is alkyl of one to four carbon atoms.

* * * * *